(12) United States Patent
Yokoi et al.

(10) Patent No.: US 7,441,458 B2
(45) Date of Patent: Oct. 28, 2008

(54) SYSTEMS FOR MEASURING PHYSICAL QUANTITIES

(75) Inventors: Shoji Yokoi, Nagoya (JP); Yoshihiro Kobayashi, Komagane (JP); Masayuki Takahashi, Nasushiobara (JP)

(73) Assignees: NGK Insulators, Ltd., Nagoya (JP); Seiko Epson Corporation, Shinjuku-Ku (JP); Seiko NPC Corporation, Chuo-Ku (JP)

( * ) Notice: Subject to any disclaimer, the term of this patent is extended or adjusted under 35 U.S.C. 154(b) by 160 days.

(21) Appl. No.: 11/039,712

(22) Filed: Jan. 19, 2005

(65) Prior Publication Data

US 2005/0204814 A1    Sep. 22, 2005

(30) Foreign Application Priority Data

Jan. 20, 2004    (JP)    ............... 2004-011568

(51) Int. Cl.
*G01C 19/02*    (2006.01)
*H01L 41/09*    (2006.01)

(52) U.S. Cl. ............... 73/504.12; 73/504.04; 381/317

(58) Field of Classification Search ............... 73/504.12, 73/514.29, 1.38, 1.37, 514.33, 514.34, 514.01, 73/514.17, 504.15, 504.16, 504.14, 504.04, 73/514.15, 514.16; 310/370, 319, 317, 320
See application file for complete search history.

(56) References Cited

U.S. PATENT DOCUMENTS

| | | | |
|---|---|---|---|
| 5,148,126 A | * | 9/1992 | Spencer ............... 331/135 |
| 5,794,080 A | * | 8/1998 | Watanabe et al. ............ 396/53 |
| 6,028,332 A | | 2/2000 | Kano et al. |
| 6,288,474 B1 | * | 9/2001 | Ono et al. ............... 310/319 |
| 6,345,533 B1 | | 2/2002 | Nozoe |
| 6,450,030 B1 | * | 9/2002 | Fujimoto ............... 73/504.04 |
| 6,497,146 B1 | | 12/2002 | Hobbs et al. |
| 6,543,285 B2 | * | 4/2003 | Hashimoto ............... 73/504.14 |
| 6,564,637 B1 | * | 5/2003 | Schalk et al. ............ 73/504.12 |
| 6,564,638 B1 | * | 5/2003 | Ebara ............... 73/504.14 |
| 6,568,267 B2 | * | 5/2003 | Chida et al. ............ 73/504.12 |
| 6,907,784 B2 | * | 6/2005 | Kato ............... 73/514.15 |
| 2006/0016259 A1 | * | 1/2006 | Smith ............... 73/504.02 |
| 2006/0042960 A1 | * | 3/2006 | Tice ............... 205/775 |

FOREIGN PATENT DOCUMENTS

| | | | |
|---|---|---|---|
| EP | 0318972 A2 | * | 6/1989 |
| JP | 403220806 A | * | 9/1991 |
| JP | 07-270165 | | 10/1995 |
| JP | 09-084789 | | 3/1997 |
| JP | 11-26777 | | 1/1999 |
| JP | 11-281372 | | 10/1999 |
| JP | 2000-002543 | | 1/2000 |
| JP | 2002-174521 | | 6/2002 |

* cited by examiner

*Primary Examiner*—Hezron E. Williams
*Assistant Examiner*—Jacques M. Saint-Surin
(74) *Attorney, Agent, or Firm*—Burr & Brown

(57) ABSTRACT

It is provided a system for measuring a physical quantity based on a detection signal using a vibrator 1, a self-oscillating circuit 12A oscillating a driving vibration in the vibrator 1 and a detection circuit for outputting a detection signal from the vibrator 1. The self-oscillating circuit 12A comprises a current-voltage converter 3 and a low pass filter 25. The detection circuit comprises a charge amplifier circuit amplifying an output signal from the vibrator, and the current-voltage converter and the charge amplifier circuit are formed in a monolithic IC.

4 Claims, 8 Drawing Sheets

SYSTEMS FOR MEASURING PHYSICAL QUANTITIES

This application claims the benefit of Japanese Application P2004-11568, filed Jan. 20, 2004, the entirety of which is incorporated herein by reference.

BACKGROUND OF THE INVENTION

1. Field of the Invention

The present invention provides a system of measuring a physical quantity such as a vibratory gyroscope or the like.

2. Related Art Statement

The inventors have studied various applications of a vibratory gyroscope. For example, it has been studied to use a vibratory gyroscope as a turning angular rate sensor employed in a vehicle control system of an automobile body based on a vehicle turning rate feedback system. Such a system detects the direction of a steering wheel itself by a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting a wheel torque and a steering angle on the basis of this difference. The applicant filed Japanese patent publication 11-281372A mainly disclosing a vibratory gyroscope suitable for horizontal mounting using a planar vibrator.

DISCLOSURE OF THE INVENTION

When a vibratory gyroscope is produced, a self-oscillating circuit is used to excite driving vibration in a driving vibration arm made of, for example quartz. Further, output voltage from a detection electrode on a vibrator is processed to obtain a value of voltage corresponding to a turning angular rate. According to prior arts, self-oscillating and detection circuits has been formed on discrete IC chips. Such method requires many manufacturing steps for the completion of the fabrication. The inventors have thus studied the method of mass production of driving and detection circuits by forming the self-oscillating and detection circuits on a monolithic IC chip.

When a driving current was measured for each of the self-oscillating circuits of many vibratory gyroscopes produced according to the same specification, however, the driving current was proved to be considerably changed responsive to a temperature change. For example, in a system for controlling vehicle body, a vibratory gyroscope is subjected to a wide range of ambient temperatures including high and low temperatures. Such temperature range may be minus 40 to plus 85° C. When the driving current is changed responsive to the temperature change, the sensitivity of the driving is also changed, so that the output current from the detection electrode is changed. A temperature drift is thereby caused in a measure value of a turning angular rate.

Further, an output current from the detection electrode is needed to be processed to obtain a detection current responsive to turning angular rate. Deviations were found, however, in the measured values of the detection current of a plurality of vibratory gyroscopes whose self-oscillating and detection circuits are formed in a monolithic IC. Such phenomenon was not found in vibratory gyroscopes whose self-oscillating and detection circuits are formed on a discrete IC's.

An object of the present invention is to reduce the deviation of detection sensitivity corresponding to a physical quantity over temperature change and among vibrators in a system of measuring the physical quantity based on a detection signal using a vibrator, a self-oscillating circuit oscillating a driving vibration in the vibrator and a detection circuit for outputting a detection signal from the vibrator wherein the self-oscillating and detection circuits are formed in a monolithic IC.

The present invention provides a system of measuring a physical quantity based on a detection signal using a vibrator, a self-oscillating circuit oscillating a driving vibration in the vibrator and a detection circuit for outputting a detection signal from the vibrator. The self-oscillating circuit comprises a current-voltage converter and a low pass filter, the detection circuit comprises a charge amplifier circuit amplifying an output signal from the vibrator, and the current-voltage converter and the charge amplifier circuit are formed in a monolithic IC.

PREFERRED EMBODIMENTS FOR CARRYING OUT THE INVENTION

The present invention will be described referring to the attached drawings.

Figure 1:
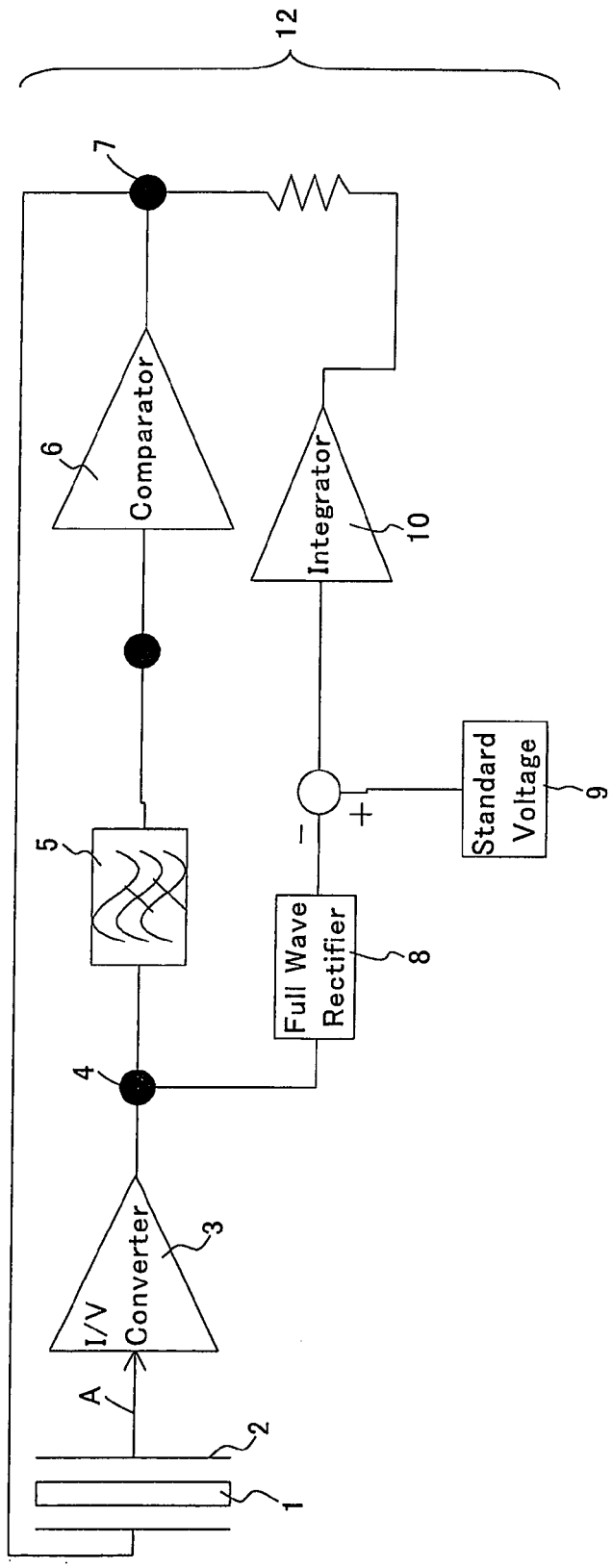
FIG. 1 is a circuit diagram showing a self-oscillating circuit 12 according to a prior art.

FIG. 1 is a diagram schematically showing a self-oscillating circuit 12 according to a prior art. A exciting means 2 is equipped with a vibrator 1 and connected with the self-oscillating circuit 12. The self-oscillating circuit 12 has a current/voltage amplifier (alternating current amplifier) 3, a high path filter 5, a comparator 6, a full wave rectifier 8, an integrator 10 and a resistor.

When the vibrator is activated, a noise is input from an activation circuit to the self-oscillating circuit 12. The noise passes through the driving vibration part of the vibrator 1 and is subjected to frequency selection, and then input into the alternating current amplifier 3 for the subsequent amplification to a voltage value as an arrow "A". A part of the output signal from the alternating current amplifier 3 is drawn and input to the full wave rectifier 8 to convert the signal to the level (amplitude) value of the signal. 5 represents a high pass filter and 9 represents a standard voltage source. The signal of amplitude value is input to the integrator 10. The self-oscillating circuit 12 is connected to the diagnosis circuit, and the output of the diagnosis circuit is output through a DIAG terminal to the outside.

During the initial stage of the activation, most of the noise is cut at the vibrator 1 so that the full wave rectifier 8 gives a relatively low level of output. The output voltage at the integrator 10 is thus made large so that the loop gain during one passage of the oscillation loop is made larger than 1. As the output from the rectifier 8 becomes larger over time, the output voltage at the integrator 10 is made lower so that the loop gain is adjusted at 1.

Figure 2:
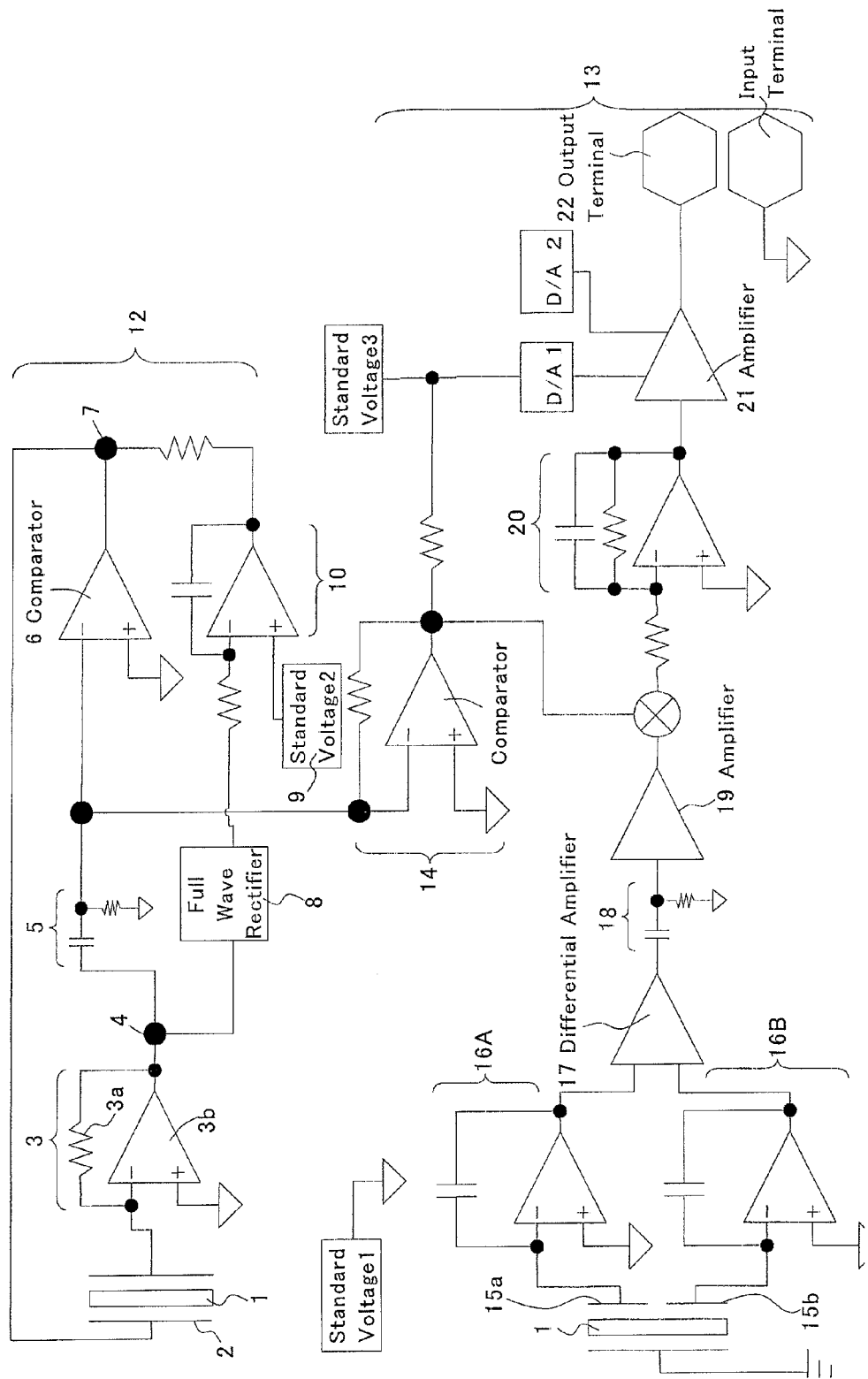
FIG. 2 is a circuit diagram showing a self-oscillating circuit 12 and detection circuit 13 according to a prior art.

FIG. 2 is a block diagram showing a self-oscillating circuit 12 and a detection circuit 13 used in the present example. The current/voltage converter 3 has a resistance 3a and a operational amplifier 3b connected parallel with each other. The detection circuit 13 will be described further in detail.

Figure 3:
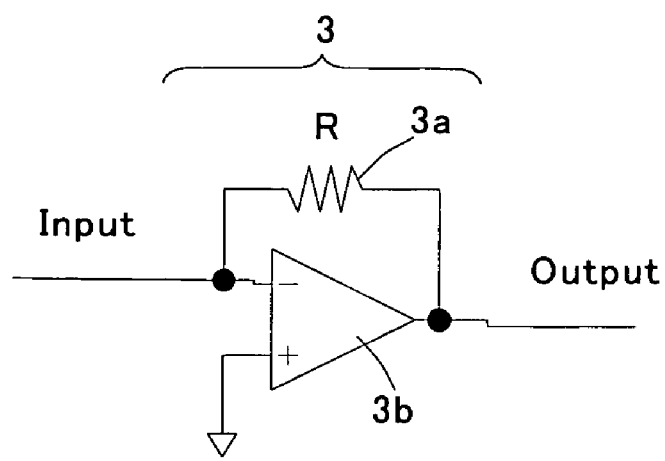
FIG. 3 is a circuit diagram showing an example of construction of a current/voltage converter 3.

FIG. 3 is a block diagram showing a construction of a typical current/voltage converter 3. The resistance 3a and an operational amplifier 3b are connected in parallel with each other. The operational amplifier 3b has minus and plus terminals functioning as input terminals. The value of the output voltage is assigned to "A"×[(voltage at the plus terminal)− (voltage at the minus terminal)] ("A" is sufficiently larger than 1). As the voltage at the plus terminal is zero, the voltage at the minus terminal is needed to be zero volt for determining the output voltage. It is provided that the input voltage is assigned to "i", the voltage at the output terminal is (−R×i) as the voltage at the minus terminal is zero volt ("R" represents the resistance of a resistance 3a).

According to the inventor's investigation, however, the resistance 3a provided on a silicon wafer has a resistance value "R" with unstable temperature characteristics of, for example, 1000 ppm or more. It is considered that the temperature dependency of the driving current becomes larger when the driving current value is measured at a contact 4.

Figure 4:
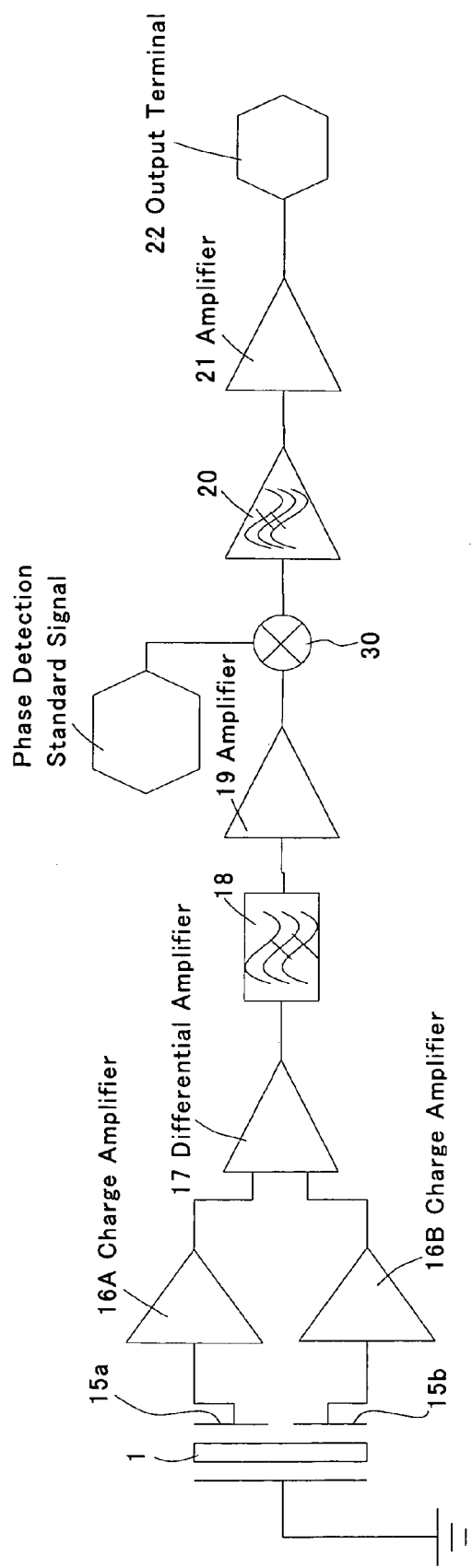
FIG. 4 is a circuit diagram showing an example of construction of a detection circuit.

FIG. 4 is a block diagram showing an example of a detection circuit. Detection signals from detection means 15a and 15b are amplified using charge amplifiers 16A, 16B, respectively. The difference of the output signals is amplified with a working amplifier 17, and then passed through a high path filter 18 and an amplifier 19. On the other hand, a part of a driving signal is derived and the thus derived signal is supplied to a phase shifter 30 to detect the output signal from the vibrator. As a result, unnecessary leakage signal should be cancelled or at least reduced in the output signal after the phase detection. The output signal after the phase detection is input into a low pass filter 20 and an amplifier 21, whose output is drawn to the outside through a terminal 22.

Figure 5:
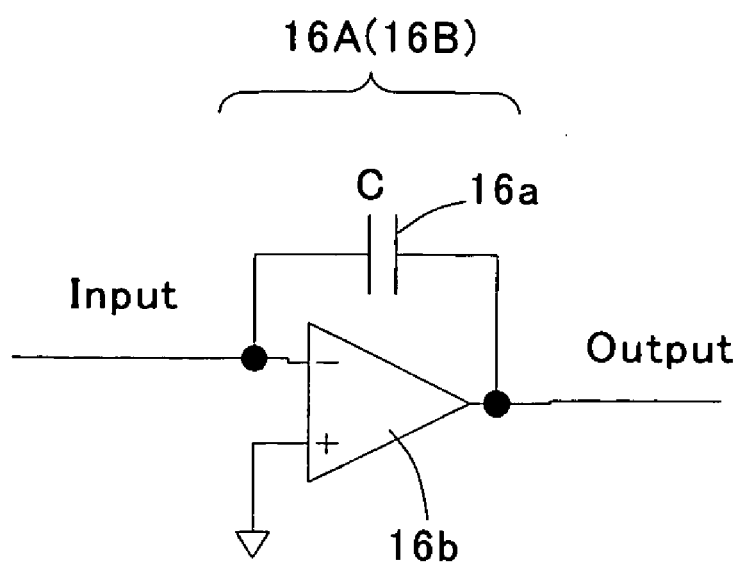
FIG. 5 is a circuit diagram showing a construction of a charge amplifier circuit.

Examples of construction of charge amplifier circuits 16A and 16B are shown in FIG. 5. The circuit is composed of a condenser 16a and an operational amplifier 16b connected parallel with each other. The operational amplifier 16b has minus and plus terminals both functioning as input terminals. The value of the voltage at the plus terminal is assigned to zero volt. As the voltage at the plus terminal is zero volt, the voltage at the minus terminal is needed to be zero volt for determining the output voltage. It is provided that the input voltage is assigned to "i", the voltage at the output terminal is (−i/ωC), as the voltage at the minus terminal is zero volt ("C" represents a capacitance of the condenser 16a).

The capacitances of the condensers provided on wafers are substantially deviated among the wafers, for example, as large as 20 percent. The voltages after the amplification of the output signal from the vibrator with the charge amplifier circuits are made different with each other and deviated.

Figure 6:
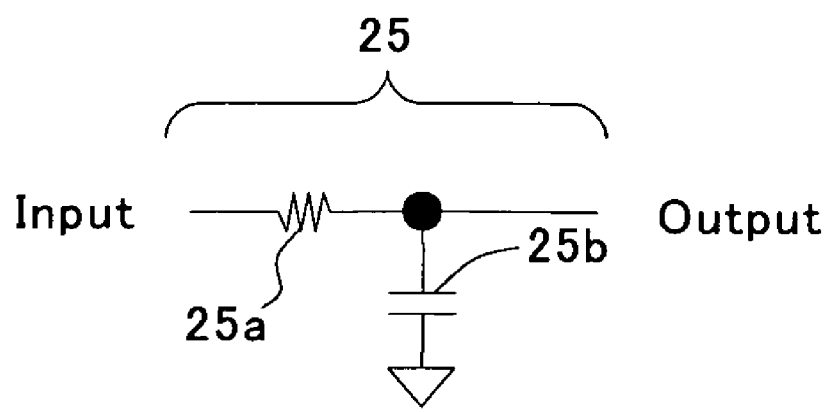
FIG. 6 is a circuit diagram showing an example of construction of a low pass filter.

According to the present invention, a low pass filter is provided in the self-oscillating circuit. FIG. 6 shows an example of construction of a typical low pass filter 25. The low pass filter 25 has a resistance 25a and a condenser 25b. The condenser 25b is ground. According to such low pass filter, the input and output satisfy the following formula (1).

$$\frac{\text{Output}}{\text{Input}} = \frac{1}{\sqrt{1 + \left(\frac{\omega}{\omega_0}\right)^2}} \quad \text{(Formula 1)}$$

In the formula, "ω" represents a turning angular rate of an input signal, and "ω0" represents a characteristic angular rate of a low pass filter. According to approximate expression of formula (2), it is derived that (input/output) described in the formula (1) is substantially proportional to $(1/R_1 \cdot C_1)$.

$$\frac{1}{\sqrt{1 + \left(\frac{\omega}{\omega_0}\right)^2}} \approx \frac{\omega_0}{\omega} (\because \omega \gg \omega_0) \propto \frac{1}{R_1 C_1} \quad \text{(Formula 2)}$$

In the formula, $C_1$ represents the capacitance of the condenser of the low pass filter, and $R_1$ represents the resistance value of the resistance of the low pass filter.

Figure 7:
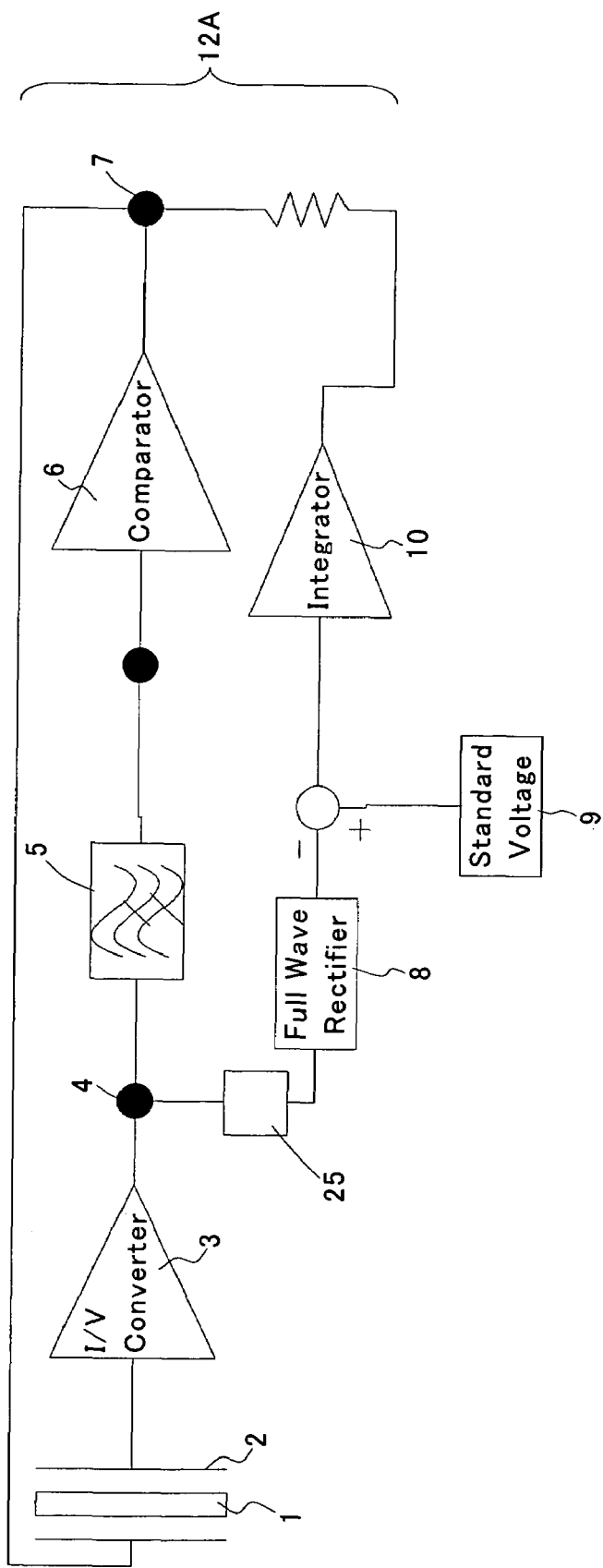
FIG. 7 is a circuit diagram showing a self-oscillating circuit 12A according to the present invention.

According to the present invention, for example, as shown in FIG. 7, a low pass filter 25 is provided in the down stream of the current/voltage converter 3, and the output of the low pass filter 25 is input into the full wave rectifier 8. In the process, the resistances forming the current/voltage converters 3 have resistances "R" which are substantially the same in the same wafer. The amplification factor in the current/voltage converter 3 is proportional to the resistance value "R" of the resistance, as described above. The amplification factor in the low pass filter 25 is proportional to $1 \times (1/R_1 \cdot C_1)$, as described above. The current value measured is thus proportional to $R \times (1/R_1 \cdot C_1)$. As a result, the current value measured in the self oscillating circuit is made proportional to $(1/C_1)$, because the temperature characteristic due to the resistance "R" of the current/voltage converter and the temperature characteristic "$R_1$" of the low pass filter cancel each other.

The self-oscillating circuits 12 and 12A are circuits for controlling the measured current value (current measured in the downstream of the contact 4) at a predetermined value. Accordingly, as the measured current is proportional to $(1/C_1)$, the driving voltage is proportional to $C_1$, so that the loop gain is adjusted at 1. The sensitivity for detection is proportional to the value of driving current. The sensitivity for detection is thus proportional to the capacitance "$C_1$" of the condenser of the low pass filter. It means that the temperature characteristic of the sensitivity for detection is made proportional to the temperature characteristic of the capacitance "$C_1$" of the condenser of the low pass filter.

Further, the sensitivity for detection of the charge amplifier circuit is proportional to (1/C) in the detection circuit.

As the whole sensitivity including those of the self-oscillating and detection circuits are proportional to the product of the driving current value and the sensitivity for detection of the charge amplifier circuit and thus proportional to $C \times (1/C_1)$. As the temperature dependency of the capacitance "C" of the condenser of the charge amplifier circuit and that of the capacitance "$C_1$" of the condenser of the low pass filter are similar, the overall temperature dependency of $C \times (1/C_1)$ is small. The overall sensitivity including the self-oscillating and detection circuits is thus not substantially influenced by the temperature dependency of the resistance value "R" of the resistance and the deviation of the capacitance "C" of the condenser among wafers.

On the viewpoint of canceling the temperature dependency as described above, the amplification factor of the low pass filter may preferably be proportional to $(1/R_1 \cdot C_1)$ as possible, although it is not required that the amplification factor is strictly proportional to $(1/R_1 \cdot C_1)$. On the viewpoint, the proportionality constant of the amplification factor of the low pass filter with respect to $(1/R_1 \cdot C_1)$ may preferably be 0.9 times or higher, and more preferably 0.95 times or higher. Further, the proportionality constant of the amplification factor of the low pass filter with respect to $(1/R_1 \cdot C_1)$ may preferably be 1.1 times or lower, and more preferably 1.05 times or lower.

For this, $\omega$ may preferably be sufficiently larger than $\omega_0$. Although the magnitude is not particularly limited, $\omega$ may preferably be 5 times or larger, more preferably be 6 times or larger and most preferably be 8 times or larger than $\omega_0$.

Figure 8:
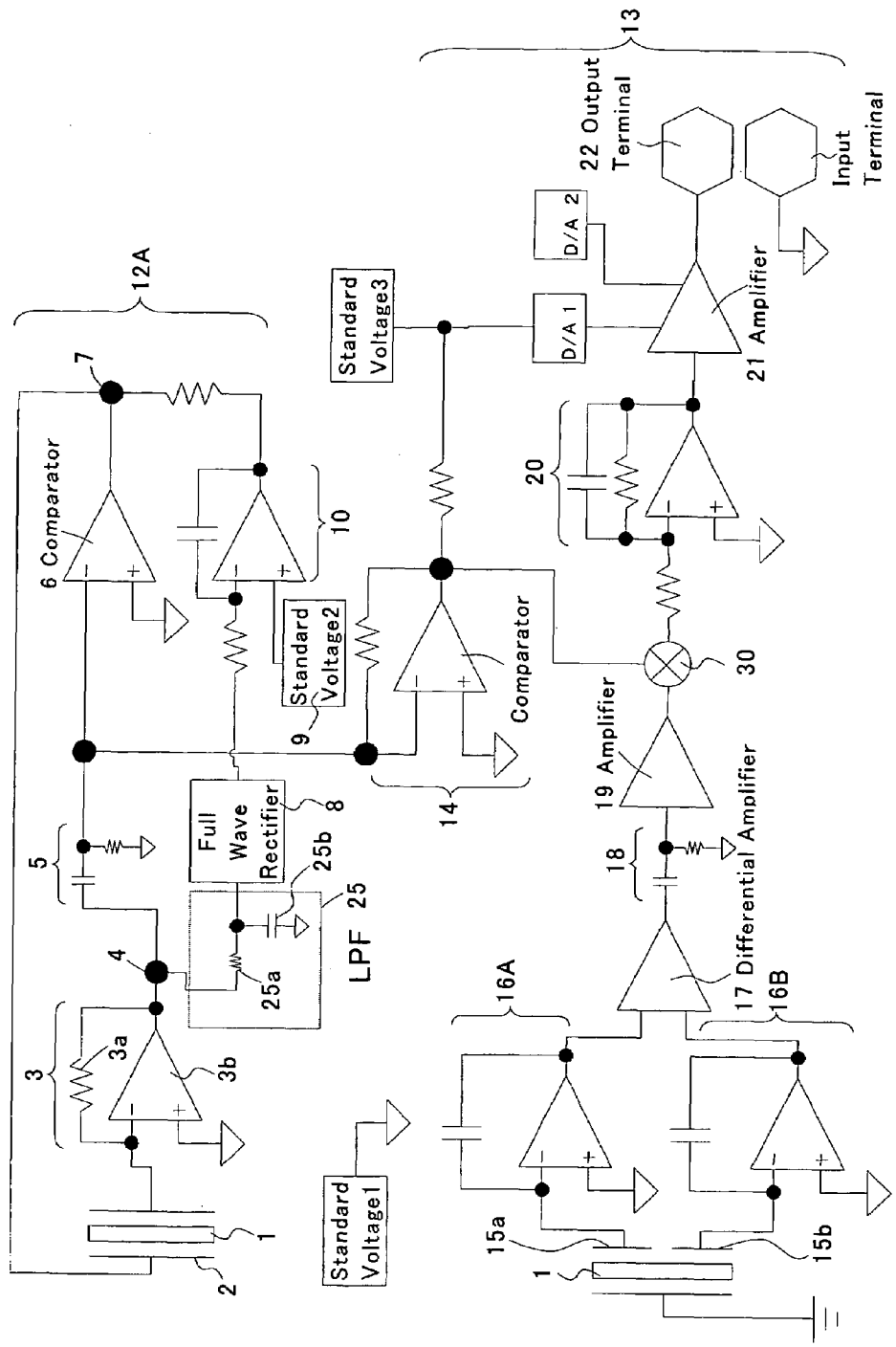
FIG. 8 is a circuit diagram showing a self-oscillating circuit 12A and detection circuit 13 according to the present invention.

FIG. 8 is a circuit diagram showing a self-oscillating circuit 12A and detection circuit 13 according to one embodiment of the present invention. The mechanism of the self-oscillating circuit is as described above. The detection means 15a and 15b provided on the vibrator 1 output signals, which are then amplified with the charge amplifiers 16A and 16B, respectively. The difference of the output signals is amplified with a working amplifier 17, and then passed through a high path filter 18 and an amplifier 19. On the other hand, a part of a driving signal is derived and the thus derived signal is supplied to a phase shifter 30 to detect the output signal from the vibrator. The output signal after the phase detection is input into a low pass filter 20 and an amplifier 21, whose output is drawn to the outside through the terminal 22.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical quantity can be detected through a detection circuit. Such physical quantity may preferably be an acceleration, an angular acceleration or an angular velocity applied on a vibrator. The measuring system of the present invention may preferably be an inertia censor.

The present invention is particularly advantageous when the current/voltage converter and low pass filter are provided on the same monolithic IC. Further, it is most preferred that the charge amplifier circuit is also provided on the same monolithic IC.

The construction of the low pass filter is not particularly limited. For example, a low cost CR filter may be preferably used.

Although the waveform of the driving signal is not particularly limited, the waveform may preferably be sine, cosine or rectangular wave.

The construction of the vibrator is not particularly limited. The material forming the vibrator may preferably have a Q value of 3000 or higher and more preferably 10000 or higher. The material forming the vibrator includes a permanent elastic alloy such as elinvar or a ferroelectric (piezoelectric) single crystal. Such single crystal includes quartz, lithium niobate, lithium tantalite, lithium niobate-lithium tantalite solid solution, lithium borate and langasite.

EXAMPLES

Example 1

An experiment for exciting a driving vibration was performed applying a circuit described above referring to FIGS. 5 to 8. A vibrator described in Japanese patent publication 11-281372A was used. The vibrator had two driving vibration pieces and two detection vibration pieces vibrating independently from the driving vibration pieces. Noise in a frequency range of 100 to 500 kHz was generated from an activation circuit, and then input into the self-oscillating circuit 12A to activate self-oscillating. The characteristic resonance frequency of the driving arms was 45 kHz and the cut-off frequency of the low pass filter was 5 kHz.

As a result, the sensitivity for detection was deviated in a range of ±2 percent in a temperature range of minus 40 to plus 85° C. Further, ten samples of vibratory gyroscopes were produced and the deviation of the sensitivity for detection was measured for each vibratory gyroscope to prove that the sensitivity for detection was deviated in a range of ±2 percent.

Comparative Example 1

Vibratory gyroscopes were manufactured according to the same procedure as the example 1 except that the low pass filter was removed from the self-oscillating circuit in the example 1. As a result, the sensitivity for detection was deviated in a range of ±10 percent between minus 40° C. to plus 85° C. Further, ten samples of vibratory gyroscopes were produced and the deviation of the sensitivity for detection was measured for each vibratory gyroscope to prove that the sensitivity for detection was deviated in a range of ±20 percent.

The invention claimed is:

1. A system of measuring a physical quantity based on a detection signal using a vibrator, a self-oscillating circuit oscillating a driving vibration in said vibrator and a detection circuit for outputting a detection signal from said vibrator,
    wherein said self-oscillating circuit comprises a current/voltage converter that converts an alternating current to a voltage, and a low pass filter comprising a resistance and a condenser, said low pass filter having an amplification factor having a proportionality factor of 0.9 or larger and 1.1 or smaller with respect to $(1/R_1 \cdot C_1)$, $C_1$ representing a capacitance of said condenser of said low pass filter and $R_1$ representing a resistance value of said resistance of said low pass filter;
    wherein said detection circuit comprises a charge amplifier circuit amplifying an output signal from said vibrator; and
    wherein said current-voltage converter and said charge amplifier circuit are formed in a monolithic IC.

2. A system of measuring a physical quantity based on a detection signal using a vibrator, a self-oscillating circuit oscillating a driving vibration in said vibrator and a detection circuit for outputting a detection signal from said vibrator,
    wherein said self-oscillating circuit comprises a current/voltage converter that converts an alternating current to a voltage, and a low pass filter;
    wherein said detection circuit comprises a charge amplifier circuit amplifying an output signal from said vibrator;
    wherein said current-voltage converter and said charge amplifier circuit are formed in a monolithic IC; and
    wherein $\omega$ is 5 times or larger of $\omega_0$, $\omega$ representing an angular frequency of an input signal, and $\omega_0$ representing a characteristic angular frequency of said low pass filter.

3. A system of measuring a physical quantity based on a detection signal using a vibrator, a self-oscillating circuit oscillating a driving vibration in said vibrator and a detection circuit for outputting a detection signal from said vibrator,
    wherein said self-oscillating circuit comprises a current/voltage converter that converts an alternating current to a voltage, and a low pass filter comprising a resistance and a condenser, a measured current value in said self-oscillating circuit being substantially proportional to $(1/C_1)$, $C_1$ representing a capacitance of said condenser of said low pass filter;

wherein said detection circuit comprises a charge amplifier circuit amplifying an output signal from said vibrator; and wherein said current-voltage converter and said charge amplifier circuit are formed in a monolithic IC.

4. The system of claim 3, wherein said current-voltage converter comprises a resistance.

* * * * *